United States Patent [19]
Furuta et al.

[11] Patent Number: 5,385,976
[45] Date of Patent: Jan. 31, 1995

[54] THERMOPLASTIC RESIN COMPOSITION

[75] Inventors: Motonobu Furuta; Hiroomi Abe, both of Chiba; Takeshi Fujii, Sodegaura; Masashi Yamamoto, Ichihara, all of Japan

[73] Assignee: Sumitomo Chemical Company, Limited, Osaka, Japan

[21] Appl. No.: 867,191

[22] Filed: Jul. 2, 1992

[30] Foreign Application Priority Data

Nov. 2, 1990 [JP] Japan ................................. 2-297582

[51] Int. Cl.⁶ ...................... C08F 255/02; C08L 71/12
[52] U.S. Cl. ............................................ 525/68; 525/69; 525/71; 525/905
[58] Field of Search ................... 525/68, 905, 71, 69

[56] References Cited

U.S. PATENT DOCUMENTS

| | | | |
|---|---|---|---|
| 4,914,153 | 4/1990 | Togo et al. | 525/68 |
| 5,086,112 | 2/1992 | Togo et al. | 525/68 |
| 5,162,440 | 11/1992 | Akkapeddi et al. | 525/68 |
| 5,182,151 | 1/1993 | Furuta et al. | 525/68 |

FOREIGN PATENT DOCUMENTS

| | | |
|---|---|---|
| 0268486 | 5/1988 | European Pat. Off. . |
| 0285976 | 10/1988 | European Pat. Off. . |
| 0308255 | 3/1989 | European Pat. Off. . |
| 0329423 | 8/1989 | European Pat. Off. . |
| 0408255 | 1/1991 | European Pat. Off. . |
| 54-44026 | 12/1979 | Japan . |
| 63-128056 | 5/1988 | Japan . |
| 117504 | 3/1989 | Japan . |
| 1297456 | 11/1989 | Japan . |
| 2173137 | 7/1990 | Japan . |

*Primary Examiner*—James J. Seidleck
*Assistant Examiner*—Thomas Hamilton, III
*Attorney, Agent, or Firm*—Birch, Stewart, Kolasch & Birch

[57] ABSTRACT

A thermoplastic resin composition comprising a modified polyphenylene ether to which an amino group-containing monomer such as amino styrene is grafted and a propylene polymer which is modified with a compound having a functional group reactive with an amino group in a molecule. This composition is excellent in heat resistance, chemical resistance, impact resistance and appearance and used to produce a part which is required to have strength and heat resistance such as an automobile part.

19 Claims, No Drawings

THERMOPLASTIC RESIN COMPOSITION

FIELD OF THE INVENTION

The present invention relates to a novel thermoplastic composition which is used to produce a molded article in injection molding and extrusion molding.

Description of the Prior Art

In general, a polyphenylene ether has excellent properties such as heat resistance, hot water resistance, dimensional stability, and mechanical and electrical properties, but it has some drawbacks such as high melt viscosity, poor moldability, low chemical resistance and low impact resistance.

As a composition which improves the moldability by decreasing the melt viscosity while maintaining the good properties of the polyphenylene ether, there is known a composition comprising the polyphenylene ether and a polystyrene resin. However, the chemical resistance is not improved.

Since a propylene polymer is excellent in moldability, toughness, water resistance and chemical resistance, has a low specific gravity and is cheap, it is widely used as a raw material of various molded articles, a film or a sheet.

However, the propylene polymer is insufficient in heat resistance, stiffness, impact resistance, coating properties or adhesion, or should be improved in such properties. This prevents new application of the propylene polymer. In particular, improvement of the heat resistance and the impact resistance is highly desired.

In view of the above, it may be expected that a wide variety of new applications could be found if the polyphenylene ether and the propylene polymer were compounded to give a resin composition having the good properties of the both polymers and improved moldability and impact resistance.

However, practically, the polyphenylene ether and the propylene polymer have low compatibility with each other even if they are compounded, so that, in a molded article produced by the injection molding, the polyphenylene ether and the propylene polymer are phase separated, and the article has extremely poor appearance and deteriorated mechanical properties. In the market, it is still highly desired to provide a resin composition having high impact resistance and good weather resistance while maintaining excellent heat resistance of the polyphenylene ether.

To improve the compatibility between the polyphenylene ether and the propylene polymer, for example, EP-A-329 423 discloses the use of a propylene polymer to which a styrene monomer is graft polymerized in combination with the polyphenylene ether.

EP-A-329 423 discloses that a composition having good heat resistance and mechanical properties is obtained by compounding the propylene polymer to which styrene or a mixture of styrene and a monomer copolymerizable with styrene is grafted or a rubber in the polyphenylene ether. Japanese Patent Kokai Publication No. 173137/1990 discloses a resin composition comprising a polyolefin having an amino group and a polyphenylene ether having a polar group.

When the above composition is used, a molded article is not necessarily satisfactory in impact resistance, heat resistance or moldability, or is insufficient in elongation, tensile modulus or chemical resistance. Further, the injection molded article has insufficient mechanical properties at a welded part. Therefore, in some applications, the use of such composition is difficult. In addition, the composition is expensive. Therefore, the market requires a cheap composition having improved properties.

DESCRIPTION OF THE INVENTION

As a result of the extensive research by the present inventors for seeking a composition which is excellent in heat resistance and mechanical strength and also in moldability and chemical resistance, the present invention has been completed.

Accordingly, the present invention relates to a thermoplastic resin composition comprising (A) 99 to 1% by weight of a modified polyphenylene ether to which at least one monomer or monomer mixture selected from the following monomers and monomer mixtures (a) to (d) is grafted and (B) 1 to 99% by weight of a propylene polymer which is modified with a compound having a functional group reactive with an amino group in a molecule:

(a) an amino group-containing styrene monomer,
(b) a styrene monomer and an amino group-containing monomer,
(c) an amino group-containing styrene monomer and a styrene monomer, and
(d) an amino group-containing styrene monomer and an amino group-containing monomer, provided that said styrene monomer and said amino group-containing monomer are not an amino group-containing styrene monomer.

Polyphenylene ether which is a starting material of the modified polyphenylene ether (A) is a polymer which is obtained by oxidative polymerizing a phenol compound of the general formula:

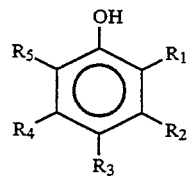

wherein $R_1$, $R_2$, $R_3$, $R_4$ and $R_5$ are each a hydrogen atom, a halogen atom, a hydrocarbon group or a substituted hydrocarbon group, provided that at least one of them is a hydrogen atom, with oxygen or an-oxygen-containing gas in the presence of an oxidative coupling catalyst.

Specific examples of $R_1$, $R_2$, $R_3$, $R_4$ and $R_5$ in the above general formula are a hydrogen atom, a chlorine atom, a bromine atom, a fluorine atom, an iodine atom, a methyl group, an ethyl group, a n- or isopropanol, a pri.-, sec. -or tert.-butyl group, a chloroethyl group, a hydroxyethyl group, a phenylethyl group, a benzyl group, a hydroxymethyl group, a carboxymethyl group, a methoxycarbonylethyl group, a cyanoethyl group, a phenyl group, a chlorophenyl group, a methylphenyl group, a dimethylphenyl group, an ethylphenyl group, an allyl group and the like.

Specific examples of the phenol compound of the above general formula are phenol, o-, m- and p-cresol, 2,6-, 2,5-, 2,4- and 3,5-dimethylphenol, 2-methyl-6-phenylphenol, 2,6-diphenylphenol, 2,6-diethylphenol, 2-methyl-6-ethylphenol, 2,3,5-, 2,3,6- and 2,4,6-trimethylphenol, 3-methyl-6-tert.-butylphenol, thymol, 2- methyl-6-allylphenol and the like. In addition, a copolymer of the phenol compound of the above general formula and a polyhydroxy aromatic compound such as bisphenol A, tetrabromobisphenol A, resorcinol, hydroquinone or a novolak resin may be used.

Among them, homopolymers of 2,6-dimethylphenol and 2,6-diphenylphenol and a copolymer of a major amount of 2,6xylenol and a minor amount of 3-methyl-6-tert.-butylphenol or 2,3,6-trimethylphenol are preferred.

The oxidative coupling catalyst used in the oxidative polymerization of the phenol compound is not critical and any catalyst which can catalyze the polymerization can be used. Typical examples of the catalyst are cuprous chloride/triethylamine and the catalysts disclosed in Japanese Patent Kokai Publication No. 160856/1990.

It is known that polyphenylene ethers obtained by oxidative polymerization at a temperature higher than 40° C. (high temperature polymerization) and a temperature not higher then 40° C. (low temperature polymerization) have different properties. In the present invention, either of the high temperature polymerization product and the low temperature polymerization product can be used.

In the component (A) of the thermoplastic resin composition according to the present invention, a monomer to be grafted on the polyphenylene ether is at least one monomer or monomer mixture selected from the following monomers or monomer mixtures (a) to (d):

(a) an amino group-containing styrene monomer,
(b) a styrene monomer and an amino group-containing monomer,
(c) an amino group-containing styrene monomer and a styrene monomer, and
(d) an amino group-containing styrene monomer and an amino group-containing monomer, provided that the above styrene monomer and the above amino group-containing monomer are not an amino group-containing styrene monomer.

Herein, the amino group-containing styrene monomer means a styrene monomer which has an amino group and is copolymerizable with the polyphenylene ether. As such monomer, a styrene monomer having a primary or secondary amino group is preferably used. In particular, aminostyrene or aminomethylstyrene is preferred. The amino group-containing styrene monomer may be used independently or as a mixture of two or more of them.

The styrene monomer except the above amino group-containing styrene is represented by the formula:

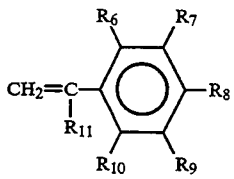

wherein $R_6$, $R_7$, $R_8$, $R_9$ and $R_{10}$ are the same and different and each a hydrogen atom, a halogen atom, a hydrocarbon group, a substituted hydrocarbon group, a hydrocarbonoxy group or a substituted hydrocarbonoxy group, and $R_{11}$ is a hydrogen atom or a lower alkyl group having 1 to 4 carbon atoms.

Specific examples of $R_6$, $R_7$, $R_8$, $R_9$ and $R_{10}$ in the above formula are a hydrogen atom; halogen atoms such as a chlorine atom, a bromine atom and an iodine atom; hydrocarbon groups such as a methyl group, an ethyl group, a propyl group, a vinyl group, an allyl group, a benzyl group and a methylbenzyl group; substituted hydrocarbon groups such as a chloromethyl group and a bromomethyl group; and substituted or unsubstituted hydrocarbonoxy groups such as a methoxy group, an ethoxy group, a phenoxy group and a monochloromethoxy group.

Specific examples of $R_{11}$ are a hydrogen atom and lower alkyl groups such as a methyl group and an ethyl group.

Specific examples of the styrene monomer are styrene, 2,4-dichlorostyrene, p-methoxystyrene, p-methylstyrene, p-phenylstyrene, p-divinylbenzene, p-(chloro-methoxy)-styrene, α-methylstyrene, o-methyl-α-methylstyrene, m-methyl-α-methylstyrene, p-methyl-α-methylstyrene, p-methoxy-α-methylstyrene and the like. They may be used independently or as a mixture of two or more of them. Among them, styrene is preferably used.

Next, the amino group-containing monomer means a monomer having an amino group which can be grafted together with the styrene monomer on the polyphenylene ether except the amino group-containing styrene monomer. As this monomer, a monomer having a primary or secondary amino group and a carbon-carbon double or triple bond in a molecule is preferably used. Preferred examples are allylamine, diallylamine, vinylimidazole, allylaniline, acrylamide, methacrylamide, N-phenylmethacrylamide and the like. They may be used independently or as a mixture of two or more of them.

In addition to the above monomer or monomer mixture (a) to (d), other monomer which is copolymerizable with the styrene monomer may be used as a copolymer component to prepare the modified polyphenylene ether (A) of the thermoplastic resin composition according to the present invention.

Specific examples of the monomer copolymerizable with the styrene monomer are acrylonitrile, methacrylonitrile, fumaric acid, maleic acid, vinyl ketone, maleic anhydride, acrylic acid, methacrylic acid, vinylidene chloride, maleates, methyl methacrylate, ethyl methacrylate, propyl methacrylate, glycidyl acrylate, glycidyl methacrylate, butyl methacrylate, methyl acrylate, 2-hydroxyethyl methacrylate, ethyl acrylate, propyl acrylate, butyl acrylate, vinyl chloride, vinyl acetate, divinylbenzene, ethylene oxide, isobutene, alkyl vinyl ether, anethol, indene, cumarone, benzofuran, 1,2-dihydronaphthalene, acenaphthylene, isoprene, chloroprene, trioxane, 1,3-dioxolane, propylene oxide, β-propiolactone, vinylbiphenyl, 1,1-diphenylethylene, 1-vinylnaphthalene, 2-vinylnaphthalene, 2,3-dimethylbutadiene, ethylene, propylene allyltrimethylsilane, 3-butenyltrimethylsilane, vinylcarbazole, fumarnitrile and the like. Derivatives of these monomers may be used. They are used independently or as a mixture of two or more of them.

There is no limitation on a process for preparing the modified polyphenylene ether, and any conventional process such as suspension polymerization, emulsion polymerization, solution polymerization or bulk polymerization as well as a process using an extruder may be employed.

For the preparation of the modified polyphenylene ether, a concrete process comprises graft polymerizing the styrene monomer and/or the other polymerizable monomer in the presence of the polyphenylene ether as disclosed in Japanese Patent Publication Nos. 47862/1972, 12197/1973, 5623/1974, 38596/1977 and 30991/1977.

Alternatively, for example, the polyphenylene ether, the amino group-containing monomer and the like are molten and kneaded together with a radical initiator to obtain the modified polyphenylene ether.

Herein, the radical initiator used in the preparation of the modified polyphenylene ether is not limited and any suitable initiator can be used.

Various radical initiators including azo compounds such as 2,2′-azobisisobutyronitrile and those disclosed in Japanese Patent Kokai Publication No. 160856/1990 are exemplified.

To the modified polyphenylene ether (A) of the thermoplastic resin composition according to the present invention, an unmodified polyphenylene ether may be compounded if necessary.

As the propylene polymer which is modified with the compound having the functional group reactive with the amino group in a molecule (B) according to the present invention, is exemplified a polymer prepared by reacting one or more compounds selected from the following groups (a) to (c) with the propylene polymer:

(a) A compound having, in a molecule, (i) a carbon-carbon double or triple bond and (ii) a carboxyl group, an acid anhydride group, an acid amide group, an imide group, a carboxylate group, an isocyanate group, a methylol group, a group having an oxazoline ring or a hydroxyl group.

Specific examples are maleic anhydride, maleic acid, fumaric acid, maleimide, maleic hydrazide, a reaction product of maleic anhydride and a diamine such as a compound having a structure of the formula:

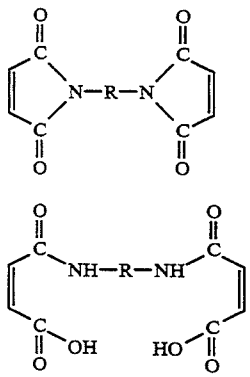

wherein R is an aliphatic or aromatic group, methylnadic anhydride, dichloromaleic anhydride, maleic acid amide, natural oils such as soy bean oil, tung oil, castor oil, linseed oil, hemp-seed oil, cotton seed oil, sesame oil, rape seed oil, peanut oil, tsubaki oil, olive oil, coconut oil and sardine oil; epoxidized natural oils such as expoxidized soy bean oil; unsaturated carboxylic acids such as acrylic acid, butenoic acid, crotonic acid, vinylacetic acid, methacrylic acid, pentenoic acid, angelic acid, tiglic acid, 2-pentenoic acid, 3-pentenoic acid, α-ethylacrylic acid, β-methylcrotonic acid, 4-pentenoic acid, 2-hexenoic acid, 2-methyl-2-pentenoic acid, 3-methyl-2-pentenoic acid, α-ethylcrotonic acid, 2,2-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, docosenoic acid, erucic acid, tetracosenoic acid, mycolipenic acid, 2,4-pentadienoic acid, 2,4-hexadienoic acid, diallylacetic acid, geranium acid, 2,4-decadienoic acid, 2,4-dodecadienoic acid, 9,12-hexadecadienoic acid, 9,12-octadecadienoic acid, hexadecatrienoic acid, linoleic acid, linolenic acid, octadecatrienoic acid, eicosadienoic acid, eicosatrienoic acid, eicosatetraenoic acid, ricinoleic acid, eleostearic acid, oleic acid, eicosapentaenoic acid, erucic acid, docosadienoic acid, docosatrienoic acid, docosatetraenoic acid, docosapentaenoic acid, tetracosenoic acid, hexacosenoic acid, hexacodienoic acid, octacosenoic acid and tetracontenoic acid or their esters, acid amides, anhydrides; unsaturated alcohols such as allyl alcohol, crotyl alcohol, methyvinylcarbinol, allylcarbinol, methylpropnenylcarbinol, 4-penten-1-ol, 10-undecen-1-ol, propargyl alcohol, 1,4-pentadien-3-ol, 1,4-hexadien-3-ol, 3,5-hexadien-2-ol, 2,4-hexadien-1-ol, 3-butene-1,2-diol, 2,5-dimethyl-3-hexene-2,5-diol, 1,5-hexadiene-3,4-diol and 2,6-octadiene-4,5-diol or unsaturated amines consisting of these unsaturated alcohols in which an OH group is substituted with a NH2 group; glycidyl acrylate, glycidyl methacrylate, allyl glycidyl ether, and the like.

Among them, maleic anhydride, fumaric acid, itaconic acid, hymic anhydride, glycidyl acrylate, glycidyl methacrylate and allyl glycidyl ether are preferred.

It is possible to use a compound having at least two functional groups from the group (i) and at least two functional groups which may be the same or different from the group (ii). Also, it is possible to use two or more compounds.

(b) a saturated aliphatic polycarboxylic acid or its derivative of the formula:

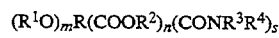

(R$^1$O)$_m$R(COOR$^2$)$_n$(CONR$^3$R$^4$)$_s$ wherein

R is an alkyl group having 2 to 20 carbon atoms, preferably 2 to 10 carbon atoms, R$^1$ is a hydrogen atom, an alkyl group, an acyl group or a carbonyldioxy group having 1 to 10 carbon atoms, preferably 1 to 6 carbon atoms, more preferably 1 to 4 carbon atoms, in particular a hydrogen atom, or an aryl group having 6 to 20 carbon atoms, R$^2$ is a hydrogen atom or an alkyl group having 1 to 20 carbon atoms, preferably 1 to 10 carbon atoms or an aryl group having 6 to 20 carbon atoms, R$^3$ and R$^4$ are each a hydrogen atom or an alkyl group having 1 to 10 carbon atoms, preferably 1 to 6 carbon atoms, more preferably 1 to 4 carbon atoms, or an aryl group having 6 to 20 carbon atoms, m is 1, n + s is equal to or larger than 2, preferably 2 or 3, n is equal to or larger than 0, and s is equal to or larger than 0 and the (R$^1$O) group is present at an α- or β-position to the carbonyl group, and a pair of the adjacent carbonyl groups have 2 to 6 carbon atoms in total.

Examples of the derivative are esters, amides, anhydrides, hydrates and salts of the saturated aliphatic polycarboxylic acid. Examples of the saturated aliphatic polycarboxylic acid are citric acid, malic acid, agaricic acid and the like. Examples of the ester are acetyl ester and mono- or distearyl ester of citric acid. Examples of the amide are N,N′-diethylamide, N,N′-dipropylamide, N-phenylamide, N-dodecylamide and N,N'-didodecylamide of citric acid and N-dodecylamide of malic acid.

(c) a compound of the formula:

$$(X)-Z-(Y)$$

wherein (X) is a group of the formula: [X'—CO]— in which X' is Cl, Br, I, OH, OR or —O—CO—$R^5$ ($R^5$ is a hydrogen atom, an alkyl group or an aryl group), (Y) is a carboxylic acid group, an acid anhydride group, an acid amide group, an imide group, a carboxylate ester group or a hydroxyl group, and (X) and (Y) are covalently bonded through a hydrocarbon group Z.

Specific examples are chloroformylsuccinic anhydride, chloroethanoylsuccinic anhydride, trimellitic anhydride, acetic anhydride, terephthalic acid chloride and the like.

Among the compounds (a) to (c) having the functional groups in the molecule, the unsaturated dicarboxylic anhydride is particularly preferred.

An amount of the compound (a) to (c) having at least one functional group in the molecule to be used for modification is from 0.01 to 20 parts by weight, preferably from 0.1 to 10 parts by weight based on 100 parts by weight of the propylene polymer.

When the amount of this compound is less than 0.01 parts by weight, the thermoplastic resin composition of the present invention has insufficient mechanical properties. When this amount exceeds 20 parts by weight, the resin composition tends to be colored or have decreased flowability.

To react the propylene polymer and the modifier compound, there are a process comprising reacting them in a well known solvent in the presence or absence of a radical initiator and a process comprising effectively reacting them in the absence of a solvent at a temperature at which the propylene polymer is molten. Any process may be employed.

When the modified propylene polymer (B) of the present invention is prepared, a styrene monomer may be used together with the compound having at least one functional group in the molecule. As the styrene monomer, the same compound as that used in the preparation of the component (A) of the present invention can be used.

The radical initiator used in the preparation of the modified propylene polymer is the same as that used in the preparation of the component (A) of the present invention.

The propylene polymer which is a raw material of the modified propylene-polymer-means a homopolymer of propylene or a random or block copolymer of a major amount of propylene and other α-olefin having 2 to 18 carbon atoms.

Specific examples of the propylene copolymer are ethylene-propylene copolymer, propylene-1-butene copolymer, propylene-1-hexene copolymer, propylene-4-methyl-1-pentene copolymer, propylene-1-octene copolymer and the like.

If necessary, to the propylene polymer, ethylene-α-olefin copolymer and/or a styrene-modified product of such copolymer may be added. As the ethylene-α-olefin copolymer, one having a density of 0.82 to 0.92 g/cm$^3$ is preferably used.

As the propylene polymer, a highly crystalline propylene polymer may be used in necessary. The highly crystalline propylene polymer intends to mean a propylene polymer in which an isotactic pentad ratio of a part insoluble in boiling heptane in a homopolymer or a homopolymer segment which is a first segment polymerized in the first step of the block copolymer is 0.970 or larger, as described in Japanese Patent Kokai Publication No. 247457/1989.

In a field where high stiffness is required, it is preferable to add a known nucleating agent to the propylene polymer.

Further, it is known that a polymer of a vinylcycloalkane having 6 or more carbon atoms effectively functions as a nucleating agent.

That is, a composition which is prepared by blending the polymer of the vinylcycloalkane having 6 or more carbon atoms as disclosed in Japanese Patent Kokai Publication No. 234462/1989 in the propylene polymer and contains 0.05 to 10,000 wt.ppm of the vinylcycloalkane units in the composition is preferred since it has high crystallinity.

By blending the vinylcycloalkane polymer in the highly crystalline propylene polymer, the propylene polymer having high stiffness is obtained.

The propylene polymers (propylene homopolymer and propylene copolymers) may be used independently or as a mixture of two or more of them.

To the component (B), if necessary, various additives such as an antioxidant, a heat stabilizer, a light stabilizer, a nucleating agent, an antistatic agent, an inorganic or organic colorant, a rust preventive, a crosslinking agent, a foaming agent, a lubricant, a plasticizer, a fluorescent agent, a surface smoothing agent, a surface gloss improver and the like may be added.

A reaction product which is prepared by melting and kneading (A) the modified polyphenylene ether to which at least one monomer or monomer mixture selected from the specific groups is grafted and (B) the propylene polymer which is modified with the compound having the functional group reactive with the amino group in the molecule has superior properties such as heat resistance, mechanical properties and appearance to a composition comprising the propylene polymer and the modified polyphenylene ether or a composition wherein an interface is formed by an intermolecular force between the styrene chains of the modified propylene polymer and those of the modified polyphenylene ether.

The function of the present invention may be achieved by synergistic effects of the reaction between the functional group of the modified propylene polymer and the amino group of the modified polyphenylene ether and the intermolecular force between the styrene chains of the modified propylene polymer and those of the modified polyphenylene ether and thereby a bonding force of the modified propylene polymer and the modified polyphenylene ether at the interface and the dispersibility of the modified polyphenylene ether in the thermoplastic resin composition according to the present invention are significantly improved.

According to the present invention, the desired thermoplastic resin composition is obtained when the ratio of the component (A) to the component (B) is in the specific range. A composition of the components (A) and (B) is 99 to 1% by weight of the component (A) and 1 to 99% by weight of the component (B).

When the amount of the component (A) is less than 1% by weight, the resin composition has insufficient heat resistance. When it exceeds 99% by weight, the processability and the chemical resistance of the resin composition are insufficient.

In the resin composition according to the present invention, preferably the component (A) forms a discontinuous phase while the component (B) forms a continuous phase. In such case, the resin composition is excellent in chemical resistance and moldability and the molded article of the composition has good appearance.

Preferably, the amounts of the components (A) and (B) are 80 to 1% by weight and 20 to 99% by weight respectively. More preferably, an amount of the component (A) is from 70 to 1% by weight, while an amount of the component (B) is from 30 to 99% by weight.

In the resin composition according to the present invention, it is possible to add the unmodified polyphenylene ether to the modified polyphenylene ether (A) and also to add the unmodified propylene polymer to the modified propylene polymer (B), if desired. In such case, the modified propylene polymer and the unmodified propylene polymer are well compatible with each other, and the modified polyphenylene ether and the unmodified polyphenylene ether are well compatible with each other.

In this case, by the same reason as above, preferably the compatibilized polyphenylene ether part forms the discontinuous phase, while the compatibilized propylene polymer part forms the continuous phase.

When the unmodified propylene polymer is blended with the modified propylene polymer (B) in the thermoplastic resin composition according to the present invention, amounts of the components (A) and (B) and the unmodified propylene polymer are preferably 1 to 90% by weight, 94 to 1% by weight and 5 to 98% by weight, respectively, more preferably, 1 to 80% by weight, 94 to 10% by weight and 10 to 89% by weight, respectively.

In the resin composition according to the present invention, if desired, a rubber-like material (C) may be used to improve the impact resistance. Herein, the rubber-like material intends to mean a natural or synthetic polymer material which is elastic at room temperature.

Specific examples of the rubber-like material are natural rubber, butadiene polymer, butadiene-styrene copolymer including random, block and graft copolymers, their hydrogenated derivatives, isoprene polymer, chlorobutadiene polymer, butadiene-acrylonitrile copolymer, isobutylene polymer, isobutylene-butadiene copolymer, isobutylene-isoprene copolymer, acrylate copolymer, ethylene-α-olefin copolymer, styrene-isoprene copolymer or their hydrogenated derivatives, styrene-ethylene-butylene copolymer, styrene-butylene copolymer, styrene-ethylene-propylene copolymer, perfluororubber, fluororubber, chloroprene rubber, butyl rubber, silicone rubber, ethylene-α-olefin-nonconjugated diene copolymer, Thiokol rubber, polysulfide rubber, polyurethane rubber, polyether rubber (e.g. propylene oxide, etc.), epichlorohydrin rubber, polyester elastomer, polyamide elastomer, epoxy group-containing copolymer and the like.

Herein, the epoxy group-containing copolymer intends to mean a copolymer comprising an unsaturated epoxy compound and an ethylenically unsaturated compound.

An amount of the component (C) based on the sum of the components (A) and (B) is from 0 to 60 parts by weight per 100 parts by weight of the total weight of the components (A) and (B). When the amount of the component (C) exceeds 60 parts by weight, the heat resistance of the resin composition greatly deteriorated unpreferably.

In the thermoplastic resin composition according to the present invention, an inorganic filler may be optionally added to improve, in particular, stiffness and dimensional stability of the molded article.

As the inorganic filler, calcium carbonate, talc, clay, silica, magnesium carbonate, barium sulfate, titanium oxide, alumina, gypsum and the like are exemplified. Among them, talc and calcium carbonate are preferred.

The inorganic filler preferably has an average particle size of 0.05 to 10 $\mu$m.

When the particle size is less than 0.05 $\mu$m, the dimensional stability and stiffness of the molded article are not materially improved. When the particle size exceeds 10 $\mu$m, the surface gloss of the molded article is considerably deteriorated. As the inorganic filler, glass fiber may be used.

In addition to the above components, the thermoplastic resin composition according to the present invention may optionally contain a melt flow improver.

As the melt flow improver, any of known ones may be used. Preferably, white oil, liquid paraffin, low molecular weight hydrocarbon resin, low molecular weight polyolefin and the like are exemplified. Their modified products may be used. As the white oil, for example, one disclosed in Japanese Patent Kokai Publication No. 238051/1990 and the like may be used.

The liquid paraffin is one prepared by distilling a crude oil under atmospheric or reduced pressure to remove unsaturated components, aromatics, sulfur compounds, etc.

As the low molecular weight hydrocarbon resin, one disclosed in Japanese Patent Kokai Publication No. 160858/1990 and the like are used.

The above exemplified melt flow improvers may be used independently or as a mixture of two or more of them.

To carry out the present invention, if desired, various additives such as an antioxidant, a heat stabilizer, a light stabilizer, a flame retardant, a lubricant, an antistatic agent, an inorganic or organic colorant, a rust preventive, a crosslinking agent, a foaming agent, a fluorescent agent, a surface smoothing agent, a surface gloss improver and the like can be added to the composition during the preparation of the composition or during processing after the preparation of the composition.

The flame retardant is explained further in detail. The flame retardant useful in the present invention includes a group of the compounds well known to those skilled in the art.

In general, among the flame retardants, is used a compound comprising an element which can impart flame retardancy to the composition such as bromine, chlorine, antimony, phosphorus and nitrogen as disclosed in Japanese Patent Kokai Publication No. 160856/1990. For example, a halogen-containing organic compound, antimony oxide, a mixture of antimony oxide and the halogen-containing compound, a mixture of antimony oxide and a phosphorus compound, a mixture of phosphorus and the phosphorus compound, a mixture of the phosphorus compound and a compound having a phospho-rus-nitrogen bond, and a mixture containing two or more of such compounds are used.

There is no limitation on a process for preparing the thermoplastic resin composition according to the present invention, and any conventional process is used. For example, a process comprising mixing the components in the form of solutions, and evaporating a solvent or precipitating the components in a non-solvent liquid is effective. From the industrial view point, preferably the components are kneaded in molten states. For melt kneading, any kneading machine such as a single or twin screw extruder, various kneader and the like is used. In particular, a twin screw kneader is preferred.

For kneading, the components are preferably uniformly premixed using a tumbling mixer or a Henschel mixer. Optionally, the components are separately charged after metering to the kneading machine without premixing.

The kneaded resin composition is molded by a conventional molding process such as injection molding, extrusion molding and the like. The component may be dry blended during injection molding or extrusion molding without prekneading, kneaded during the melt processing step and then directly molded to produce the molded article.

In the present invention, there is no limitation on a sequence of kneading the components. The components (A), (B) and (C) are simultaneously kneaded, or the components (A) and (B) are kneaded first and then the component (C) is kneaded. Other kneading sequence may be employed.

Effects of the Invention

The thermoplastic resin composition according to the present invention is excellent in heat resistance, melt flowability, processability, chemical resistance, impact resistance, appearance and gloss. Using such good properties, it is used in the form of a molded article, a sheet, a tube, a film, a fiber, a laminate or a coating material by injection molding or extrusion molding.

In particular, the resin composition of the present invention is used for producing automobile parts including interior and exterior parts such as a bumper, a glove box, a console box, a braking oil reservoir, a radiator grill, a cooling fan, a lump housing, an air cleaner, an instrument panel, a fender, a door trim, a rear end trim, a door panel, a wheel covering, a side protector, an air intake, a garnish, a trunk lid, a bonnet, a sirocco fan, a roof and the like, and also machine parts which are required to be heat resistant. Further, the resin composition of the present invention is used for producing parts of two-wheelers such as a covering, a muffler covering and a leg shield.

In addition, the resin composition of the present invention can be used as a shielding material of an optical fiber cable, and also an electric and electronic part such as a housing, a chassis, a connector, a printed circuit board, a pulley and other parts which are required to have strength and heat resistance.

EXAMPLES

The present invention will be illustrated by the following examples, which are only for explanation purpose and do not limit the scope of the present invention.

Hereinafter, the polyphenylene ether and the propylene polymer may be abbreviated as "PPE" and "PP", respectively in some cases.

(I) Physical property measurement

The measurement of the physical properties were carried out for a molded article which was prepared by kneading the composition using a twin screw extruder at a cylinder temperature of 260° to 330° C. and injection molding the composition using an injection molding machine (IS 150EV manufactured by Toshiba Machine Co., Ltd.) at a molding temperature of 260° to 330° C. and a mold temperature of 70° to 140° C.

A deformation temperature under load (HDT) was measured according to JIS K 7207 and an Izod impact strength (at a thickness of 3.2 mm) was measured according to JIS K 71100.

A reduced viscosity ($n_{sp}/c$) was measured with a 0.5 g/dl solution in chloroform at 23° C.

A melt flow index (MI) of the propylene polymer was measured according to JIS K 6758 at 230° C. under a load of 2.16 kg.

A flexural modulus was measured with the injection molded article according to ASTM D 790.

Appearance of the injection molded article was evaluated according to the following criteria:
  O: The appearance is beautiful and few flow mark or little color tone change is observed.
  X: Flow marks and color tone change are observed on the surface of the molded article.

Morphological observation of the injection molded article was carried out as follow:

The injection-molded article was sliced with a microtome, etched with carbon tetrachloride and observed by a scanning electron microscope. The results were classified as follows:
  A: The polyphenylene ether part (the modified PPE and the unmodified PPE) formed a discontinuous phase and the propylene polymer part (the modified PP and the unmodified PP) formed a continuous phase.
  B: The polyphenylene ether part formed a continuous phase and the propylene polymer part formed a discontinuous phase.

(II) Used materials

Hereinafter, as a radical initiator, Perbutyl PV (a trade name of Miyoshi Fat and Oil Co., Ltd.) was used, and as a dispersant, Metrose 90 SH-100 (a trade name of Shin-Etsu Chemical Co., Ltd.) was used.

(1) Modified polyphenylene ether, a component (A)

(i) To a polyphenylene ether having $n_{sp}/c$ of 0.50 (manufactured by Nippon Polyether Co., Ltd.) (100 parts by weight), diallylamine (4.3 parts by weight) and styrene (8 parts by weight) were added together with the radical initiator and the stabilizer and mixed by a Henschel mixer. Then, the mixture was pelletized using a twin screw extruder (manufactured by Toshiba Machine Co., Ltd) at 303° C. to obtain a modified polyphenylene ether, which will be referred to as "A-1".

(ii) To a polyphenylene ether having $n_{sp}/c$ of 0.30 (manufactured by Nippon Polyether Co., Ltd.) (100 parts by weight), aminostyrene (12 parts by weight), glycidyl methacrylate (3 parts by weight) and water (400 parts by weight) were added together with the radical initiator and the dispersant in an autoclave and reacted at 97° C. for about one hour to obtain a modified polyphenylene ether, which will be referred to as "A-2".

(2) Modified propylene polymer, a component (B)

(i) A block polypropylene (MI=8.8) (100 parts by weight), styrene (3 parts by weight) and maleic anhydride (9 parts by weight) were mixed together with the radical initiator and the dispersant with a Henschel mixer. The mixture was charged in a twin screw kneader and kneaded at a cylinder temperature of 250°

C. under nitrogen atmosphere to obtain a modified propylene polymer, which will be referred to as "B-1".

(ii) A homopolypropylene (MI=4.5) (100 parts by weight), a random polypropylene (MI=12.5) (12 parts by weight), styrene (24 parts by weight), glycidyl acrylate (9 parts by weight) and water (400 parts by weight) were added together with the radical initiator and a surfactant in an autoclave and reacted at 92° C. for about one hour under nitrogen atmosphere. The resulting composition was removed from the autoclave and dried. The composition (100 parts by weight), citric acid (5 parts by weight) and styrene (1 part by weight) were charged in a twin screw kneading extruder together with the radical initiator and the stabilizer and kneaded at a cylinder temperature of 250° C. to obtain a modified propylene polymer, which will be referred to as "B-2".

(3) Rubber-like material, a component (C)

C-1: An ethylene-propylene rubber modified with maleic anhydride obtained by reacting maleic anhydride with an ethylene-propylene rubber (EPR)

C-2: An ethylene-epoxy acrylate copolymer, Bondfast 2B (a trade name of Sumitomo Chemical Co., Ltd.)

C-3: A styrene-butadiene-styrene block copolymer, Clayton TR 1102 (a trade name of Shell Chemical Co., Ltd.)

C-4: An ethylene-propylene-diene rubber, Esprene E 301 (a trade name of Sumitomo Chemical Co., Ltd.) (ML$_{1+4}$ 100° C.=56)

C-5: A styrene-ethylene-propylene block copolymer, Clayton G 1701 X (a trade name of Shell Chemical Co., Ltd.)

Examples 1–5 and Comparative Examples 1–4

Components were compounded and kneaded in a composition shown in Table 1 or 2, and the physical properties were measured. The results are shown in Table 1 or 2.

TABLE 1

| Example No. | Composition (% by weight) | | | | | | Physical properties | | | | | |
|---|---|---|---|---|---|---|---|---|---|---|---|---|
| | Polyphenylene ether part | | Propylene polymer part | | | | HDT(°C.) Load: 4.6 kg/cm$^2$ | Izod impact strength (kg · cm/cm) | | Flexural modulus (kg/cm$^2$) | Appearance | Morphology |
| | Comp. A Mod. PPE | Unmod. PPE | Comp. B Mod. PP | Unmod. PP | Component C | Others | | −30° C. | 23° C. | | | |
| 1 | A-1 (38) | — | B-1 (29) | *1 (33) | — | — | 158 | 7 | 18 | 10500 | O | A |
| C. 1 | — | *2 (38) | — | *1 (62) | — | — | 129 | 4 | 8 | 9200 | X | A |
| C. 2 | A-1 (38) | — | — | *1 (62) | — | — | 135 | 5 | 9 | 9700 | X | A |
| 2 | A-1 (12) | — | B-1 (15) | *1 (52) | C-1 (17) C-2 (4) | — | 118 | 12 | 23 | 8200 | O | A |
| C. 3 | — | *2 (12) | B-1 (15) | *1 (52) | C-1 (17) C-2 (4) | — | 102 | 6 | 11 | 7300 | O | A |
| 3 | A-2 (43) | — | B-2 (35) | — | C-3 (13) C-4 (9) | — | 168 | 11 | 25 | 13200 | O | A |
| 4 | A-2 (25) | — | B-2 (19) | *3 (37) | C-1 (9) C-5 (3) | 7*4 | 143 | 9 | 21 | 12800 | O | A |

Note:
*1) Block polypropylene (MI = 8.8).
*2) Manufactured by Nippon Polyether Co., Ltd.; $\eta_{sp}/c$ = 0.50.
*3) Homopolypropylene (MI = 4.5).
*4) Talc (particle size of 2.1 μm).

TABLE 2

| Example No. | Composition (% by weight) | | | | Physical properties | | | | | |
|---|---|---|---|---|---|---|---|---|---|---|
| | Polyphenylene ether part | | Propylene polymer part | | HDT (°C.) Load: 4.6 kg/cm$^2$ | Izod impact strength (kg · cm/cm) | | Flexural modulus (kg/cm$^2$) | Appearance | Morphology |
| | Comp. A Mod. PPE | Unmod. PPE | Comp. B Mod. PP | Unmod. PP | | −30° C. | 23° C. | | | |
| 5 | A-1 (75) | — | B-2 (25) | — | 183 | 4 | 14 | 17900 | O | A |
| C. 4 | — | *1 (75) | — | *2 (25) | 172 | 5 | 13 | 15800 | O | A |

Note:
*1) Manufactured by Nippon Polyether Co. Ltd. $\eta_{sp}/c$ = 0.50.
*2) Homopolypropylene (MI = 4.5).

What is claimed is:

1. A thermoplastic resin composition comprising:
(A) 99 to 1% by weight of a modified polyphenylene ether to which a styrenic monomer and an amino group-containing monomer are grafted; and
(B) 1 to 99% by weight of a propylene polymer which is modified with a compound having a functional group reactive with an amino group in a molecule, provided that said styrenic monomer and said amino group-containing monomer are not an amino group-containing styrenic monomer.

2. The thermoplastic resin composition according to claim 1, wherein said styrenic monomer is a compound of the formula:

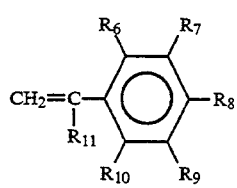

wherein $R_6$, $R_7$, $R_8$, $R_9$ and $R_{10}$ are the same or different and each a hydrogen atom, a halogen atom, a hydrocarbon group, a substituted hydrocarbon group, a hydrocarbonoxy group or a substituted hydrocarbonoxy group, and $R_{11}$ is a hydrogen atom or a lower alkyl group having 1 to 4 carbon atoms.

3. The thermoplastic resin composition according to claim 1, wherein said styrenic monomer is at least one monomer selected from the group consisting of styrene, 2,4-dichlorostyrene, p-methoxystyrene, p-methylstyrene, p-phenylstyrene, p-divinylbenzene, p-(chloromethoxy)-styrene, α-methylstyrene, o-methyl-α-methylstyrene, m-methyl-α-methylstyrene, p-methyl-α-methylstyrene and p-methoxy -α-methylstyrene.

4. The thermoplastic resin composition according to claim 3, wherein said amino group-containing monomer is at least one monomer selected from the group consisting of allylamine, diallylamine, vinylimidazole, allylaniline, acrylamide, methacrylamide, N-phenyl-methacrylamide and mixtures thereof.

5. The thermoplastic resin composition according to claim 1, wherein said amino group-containing monomer is a monomer having a primary or secondary amino group and a carbon-carbon double or triple bond in a molecule.

6. The thermoplastic resin composition according to claim 1, wherein said amino group-containing monomer is at least one monomer selected from the group consisting of allylamine, diallylamine, vinylimidazole, allylaniline, acrylamide, methacrylamide and N-phenylmethacrylamide.

7. The thermoplastic resin composition according to claim 1, wherein said compound having the functional group reactive with the amino group in a molecule is a compound having, in a molecule, at least one group selected from the bond (i) consisting of a carbon-carbon double bond and a carbon-carbon triple bond and at least one substituent selected from the group (ii) consisting of a carboxyl group, an acid anhydride group, an acid amide group, an imide group, an epoxy group, a carboxylate group, an isocyanate group, a methylol group, a group having an oxazoline ring and a hydroxyl group.

8. The thermoplastic resin composition according to claim 1, wherein said compound having the functional group reactive with the amino group in a molecule is a compound of the formula:

$(R^1O)_m R(COOR^2)_n (CONR^3R^4)_s$ wherein
R is an alkyl group having 2 to 20 carbon atoms,
$R^1$ is a hydrogen atom, an alkyl group, an aryl group, an acyl group or a carbonyldioxy group having 1 to 10 carbon atoms,
$R^2$ is a hydrogen atom, an alkyl group or an aryl group having 1 to 20 carbon atoms,
$R^3$ and $R^4$ are each a hydrogen atom, an alkyl group or an aryl group having 1 to 10 carbon atoms,
m is 1,
n +s is equal to or larger than 2
n is equal to or larger than 0, and
s is equal to or larger than 0 and the ($R^1O$) group is present at an α- or β-position to the carbonyl group, and a pair or the adjacent carbonyl groups have 2 to 6 carbon atoms in total.

9. The thermoplastic resin composition according to claim 8, wherein R is an alkyl group having 2 to 10 carbon atoms; $R^1$ is a hydrogen atom, an alkyl group, an aryl group, an acyl group or a carbonyldioxy group having 1 to 6 carbon atoms; $R^2$ is a hydrogen atom, an alkyl group or an aryl group having 1 to 10 carbon atoms; and $R^3$ and $R^4$ are each a hydrogen atom, an alkyl group or an aryl group having 1 to 6 carbon atoms.

10. The thermoplastic resin composition according to claim 9, wherein $R^1$ is a hydrogen atom, an alkyl group, an aryl group, an acyl group or a carbonyldioxy group having 1 to 4 carbon atoms; and $R^3$ and $R^4$ are each a hydrogen atom, an alkyl group or an aryl group having 1 to 4 carbon atoms.

11. The thermoplastic resin composition according to claim 8, wherein n +s is 2 or 3.

12. The thermoplastic resin composition according to claim 1, wherein said compound having the functional group reactive with the amino group in a molecule is a compound of the formula:

wherein (X) is a group of the formula: (X'—CO) in which X' is Cl, Br, I, OH, $OR^5$ or —O—CO—$R^5$ ($R^5$ is a hydrogen atom, an alkyl group or an aryl group), (Y) is a carboxylic acid group, an acid anhydride group, an acid amide group, an imide group, a carboxylate ester group or a hydroxyl group, and (X) and (Y) are covalently bonded through a hydrocarbon group Z.

13. The thermoplastic resin composition according to claim 1, wherein said modified polyphenylene ether is obtained by oxidative polymerization of a phenol compound of the general formula:

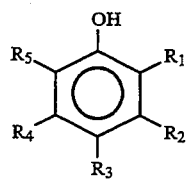

wherein $R_1$, $R_2$, $R_3$, $R_4$ and $R_5$ are each a hydrogen atom, a halogen atom, a hydrocarbon group or a substituted hydrocarbon group, provided that at least one of them is a hydrogen atom, with oxygen or an oxygen-containing gas in the presence of an oxidative coupling catalyst, to obtain a polyphenylene ether to which is grafted a styrenic monomer and an amino group-containing monomer to obtain the modified polyphenylene ether.

14. The thermoplastic resin composition according to claim 1, wherein said styrenic monomer is styrene.

15. The thermoplastic resin composition according to claim 1, wherein component (A) is present in an amount of from 70 to 1% by weight, and component (B) is present in an amount of from 30 to 90% by weight.

16. A thermoplastic resin composition comprising:
(A) 99 to 1% by weight of a modified polyphenylene ether to which a styrenic monomer and an amino group-containing monomer are grafted; and
(B) 1 to 99% by weight of a propylene polymer which is modified with a compound having a functional group reactive with an amino group in a molecule,
wherein said styrenic monomer is a compound of the formula:

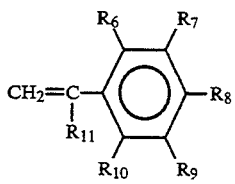

wherein $R_6$, $R_7$, $R_8$, $R_9$ and $R_{10}$ are the same or different and each a hydrogen atom, a halogen atom, a hydrocarbon group, a substituted hydrocarbon group, a hydrocarbonoxy group or a substituted hydrocarbonoxy group, and $R_{11}$ is a hydrogen atom or a lower alkyl group having 1 to 4 carbon atoms; and said amino group-containing monomer is a monomer having a primary or secondary amino group and a carbon-carbon double or triple bond in a molecule.

17. The thermoplastic resin composition according to claim 16, wherein said modified polyphenylene ether is obtained by oxidative polymerization of a phenol compound of the general formula:

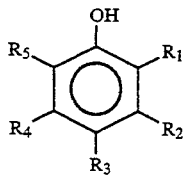

wherein $R_1$, $R_2$, $R_3$, $R_4$ and $R_5$ are each a hydrogen atom, a halogen atom, a hydrocarbon group or a substituted hydrocarbon group, provided that at least one of them is a hydrogen atom, with oxygen or an oxygen-containing gas in the presence of an oxidative coupling catalyst, to obtain a polyphenylene ether to which is grafted a styrenic monomer and an amino group-containing monomer to obtain the modified polyphenylene ether.

18. The thermoplastic resin composition according to claim 16, wherein said styrenic monomer is at least one monomer selected from the group consisting of styrene, 2,4-dichlorostyrene, p-methoxystyrene, p-methylstyrene, p-phenylstyrene, p-divinylbenzene, p-(chloromethoxy)-styrene, α-methylstyrene, o-methyl -α-methylstyrene, m-methyl-α-methylstyrene, p-methyl-α-methylstyrene and p-methoxy-α-methylstyrene;

wherein said amino group-containing monomer is at least one monomer selected from the group consisting of allylamine, diallylamine, vinylimidazole, allylaniline, acrylamide, methacrylamide, N-phenyl-methacrylamide and mixtures thereof; and wherein said compound having the functional group reactive with the amino group in a molecule is a compound having, in a molecule, at least one bond selected from the group (i) consisting of a carbon-carbon double bond and a carbon-carbon triple bond and at least one substituent selected from the group (ii) consisting of a carboxyl group, an acid anhydride group, an acid amide group, an imide group, an epoxy group, a carboxylate group, an isocyanate group, a methylol group, a group having an oxazoline ring and a hydroxyl group.

19. The thermoplastic resin composition according to claim 16, wherein component (A) is present in an amount of from 70 to 1% by weight, and component (B) is present in an amount of from 30 to 90% by weight.

* * * * *